(12) United States Patent
Harris et al.

(10) Patent No.: US 7,369,387 B2
(45) Date of Patent: May 6, 2008

(54) APPARATUS AND METHOD FOR TEMPERATURE-DEPENDENT TRANSIENT BLOCKING

(75) Inventors: Richard A. Harris, Palo Alto, CA (US); Stephen Coates, San Francisco, CA (US); Francois Hebert, San Mateo, CA (US)

(73) Assignee: FulTec Semiconductor, Inc., Moutain View, CA (US)

( * ) Notice: Subject to any disclaimer, the term of this patent is extended or adjusted under 35 U.S.C. 154(b) by 364 days.

(21) Appl. No.: 11/270,874

(22) Filed: Nov. 8, 2005

(65) Prior Publication Data

US 2006/0104004 A1 May 18, 2006

Related U.S. Application Data

(60) Provisional application No. 60/626,379, filed on Nov. 9, 2004.

(51) Int. Cl.
*H02H 5/04* (2006.01)

(52) U.S. Cl. ............ 361/103; 361/104; 361/105; 361/106; 361/93.8; 361/124

(58) Field of Classification Search ........... 361/54–58, 361/91.1, 93.8, 103–106, 111, 124, 88, 126–127
See application file for complete search history.

(56) References Cited

U.S. PATENT DOCUMENTS

| | | | |
|---|---|---|---|
| 3,916,220 A | 10/1975 | Roveti | 307/251 |
| 4,142,115 A * | 2/1979 | Nakata et al. | 327/575 |
| 4,533,970 A | 8/1985 | Brown | 361/58 |
| 4,811,156 A * | 3/1989 | Kroll | 361/58 |
| 5,130,262 A | 7/1992 | Masquelier et al. | 437/31 |
| 5,196,980 A * | 3/1993 | Carson | 361/18 |
| 5,319,515 A | 6/1994 | Pryor et al. | 361/93 |
| 5,625,519 A | 4/1997 | Atkins | 361/93 |
| 5,696,659 A | 12/1997 | Maruo | 361/93 |
| 5,729,418 A | 3/1998 | Lei | 361/58 |
| 5,742,463 A | 4/1998 | Harris | 361/88 |
| 5,789,900 A | 8/1998 | Hasegawa et al. | 320/132 |
| 5,929,665 A | 7/1999 | Ichikawa et al. | 327/109 |

(Continued)

FOREIGN PATENT DOCUMENTS

AU        A-75035/91        11/1991

(Continued)

*Primary Examiner*—Robert L. DeBeradinis
*Assistant Examiner*—Terrence R. Willoughby
(74) *Attorney, Agent, or Firm*—Lumen Patent Firm, Inc.

(57) ABSTRACT

An apparatus and method for temperature-dependent transient blocking employing a transient blocking unit (TBU) that uses at least one depletion mode n-channel device interconnected with at least one depletion mode p-channel device. The interconnection is performed such that a transient alters a bias voltage $V_p$ of the p-channel device and a bias voltage $V_n$ of the n-channel device in concert to effectuate their mutual switch off to block the transient. The apparatus has a temperature control unit that is in communication with the TBU and adjusts at least one of the bias voltages $V_p$, $V_n$ in response to a sensed temperature $T_s$, thereby enabling the apparatus to also respond to overtemperature. In some embodiments the p-channel device is replaced with a positive temperature coefficient thermistor (PTC). The temperature control unit can use any suitable circuit element, including, among other a PTC, resistor, negative temperature coefficient element, positive temperature coefficient element, transistor, diode.

24 Claims, 5 Drawing Sheets

U.S. PATENT DOCUMENTS

| | | | |
|---|---|---|---|
| 6,002,566 A | 12/1999 | Arikawa et al. | 361/93.1 |
| 6,100,745 A * | 8/2000 | Dougherty | 327/512 |
| 6,118,641 A | 9/2000 | Atkins et al. | 361/18 |
| 6,157,529 A | 12/2000 | Ahuja | 361/111 |
| 6,181,541 B1 * | 1/2001 | Souri et al. | 361/106 |
| 6,313,610 B1 | 11/2001 | Korsunsky | 320/134 |
| 6,331,763 B1 | 12/2001 | Thomas et al. | 320/136 |
| 6,351,360 B1 | 2/2002 | Kotowski et al. | 361/103 |
| 6,518,731 B2 | 2/2003 | Thomas et al. | 320/136 |
| 6,714,393 B2 | 3/2004 | Nostrand | 361/58 |
| 6,768,623 B1 | 7/2004 | Shen | 361/93.9 |
| 6,855,988 B2 | 2/2005 | Madurawe | 257/347 |
| 6,861,828 B2 | 3/2005 | Watanabe | 323/282 |
| 6,865,063 B2 | 3/2005 | Ball | 361/93.9 |
| 6,914,416 B2 | 7/2005 | Thomas et al. | 320/136 |
| 6,948,078 B2 | 9/2005 | Odaohhara | 713/300 |
| 6,958,591 B1 | 10/2005 | Smith | 320/163 |
| 6,963,477 B2 * | 11/2005 | Ikeda | 361/106 |
| 6,970,337 B2 | 11/2005 | Strahm | 361/58 |
| 7,061,739 B2 * | 6/2006 | Hastreiter et al. | 361/93.1 |

FOREIGN PATENT DOCUMENTS

| | | |
|---|---|---|
| DE | 3805811 | 9/1988 |
| DE | 4022253 | 1/1992 |
| DE | 4402461 | 8/1995 |
| DE | 4494617 | 11/1996 |
| EP | 0818867 | 1/1998 |
| EP | DE 0862255 | 2/1998 |
| GB | 2294598 | 1/1995 |
| JP | 1991053613 | 7/1991 |
| WO | WO9501667 | 1/1995 |
| WO | WO0101539 | 1/2001 |
| WO | WO03069753 | 8/2003 |
| WO | WO2004006408 | 1/2004 |
| WO | WO2004034544 | 4/2004 |

* cited by examiner

APPARATUS AND METHOD FOR TEMPERATURE-DEPENDENT TRANSIENT BLOCKING

RELATED APPLICATIONS

The present application claims the priority from provisional U.S. application 60/626,379 that was filed on 9 Nov. 2004 and is herein incorporated in its entirety.

FIELD OF THE INVENTION

This invention relates generally to apparatus and methods that employ a transient blocking unit (TBU) in conjunction with a temperature control unit to protect against over-voltage, over-current and over-temperature.

BACKGROUND ART

Many circuits, networks, electrical devices and data handling systems are operated in configurations and environments where external factors can impair their performance, cause failure or even result in permanent damage. Among the most common of these factors are over-voltage, over-current and over-temperature. Protection against these factors is important and has been addressed in the prior art in a number of ways, depending on the specific electronics and their application.

Fuses that employ thermal or magnetic elements are one common protection measure. In other cases, protection circuits are available. Some examples are described in U.S. Pat. Nos. 5,130,262; 5,625,519; 6,157,529; 6,828,842 and 6,898,060. Protection circuits are further specialized depending on conditions and application. For example, in the case of protecting batteries or rechargeable elements from overcharging and over-discharging one can refer to circuit solutions described in U.S. Pat. Nos. 5,789,900; 6,313,610; 6,331,763; 6,518,731; 6,914,416; 6,948,078; 6,958,591 and U.S. Published Application 2001/0021092. Several of these circuits include thermal protection elements such as positive thermal coefficient (PTC) elements, variable resistors and transistors as well as field effect transistors (FETs). Still other protection circuits, e.g., ones associated with power converters for IC circuits and devices that need to control device parameters and electric parameters simultaneously also use these elements. Examples can be found in U.S. Pat. Nos. 5,929,665; 6,768,623; 6,855,988; 6,861,828. Other interesting circuits designed for selective shut-down of devices in response to thermal faults are described in U.S. Pat. Nos. 6,351,360; 6,865,063.

When providing protection for very sensitive circuits, such as those encountered in telecommunications the performance parameters of the fuses and protection circuits are frequently insufficient. A prior art solution which satisfies a number of the constraints is taught in international publications PCT/AU94/00358; PCT/AU04/00117; PCT/AU03/00175; PCT/AU03/00848 as well as U.S. Pat. Nos. 4,533,970; 5,742,463 and related literature cited in these references.

Unfortunately, none of the above solutions combine the ability to protect against over-voltage, over-current and over-temperature simultaneously, while also satisfying the stringent requirements imposed by sensitive circuits.

OBJECTS AND ADVANTAGES

In view of the above prior art limitations, it is an object of the invention to provide an alternative protection device that is capable of simultaneous over-voltage, over-current and over-temperature protection while satisfying stringent requirements laid down by sensitive circuits. In other words, the object is to provide a device that can block transients and is also capable of shutting off as a function of temperature.

It is another object of the invention to provide a temperature-dependent transient blocking device that is simple in construction, requires few parts and is highly integrable.

These and other objects and advantages of the invention will become apparent from the ensuing description.

SUMMARY OF THE INVENTION

The objects and advantages of the invention are addressed by an apparatus for temperature-dependent transient blocking. The apparatus has a transient blocking unit (TBU) that uses at least one depletion mode n-channel device interconnected with at least one depletion mode p-channel device. The interconnection is performed such that a transient alters a bias voltage $V_p$ of the p-channel device and a bias voltage $V_n$ of the n-channel device in concert. Specifically, the bias voltages are altered such that the p-channel device and n-channel device mutually switch off to block the transient. The apparatus also has a temperature control unit that is in communication with the TBU and adjusts at least one of the bias voltages $V_p$, $V_n$ in response to a sensed temperature.

The temperature control unit can include an element that is connected in the TBU to adjust one or both bias voltages $V_p$, $V_n$. In one embodiment, the element has a switch that adjusts bias voltage by switching from closed to open-circuit condition. In another embodiment, the element is a variable circuit element such as a transistor. In this embodiment the transistor can be connected between the p-channel device and the n-channel device. Preferably, the p-channel device is a junction-gate field effect transistor (PJFET) and the n-channel device is a metal-oxide-semiconductor field effect transistor (MOSFET). The PJFET and MOSFET are connected by their sources and have drain-gate interconnections. The transistor of the temperature control unit is connected between the sources of the PJFET and the MOSFET. In still other embodiments, the variable circuit element is a device selected from among resistors, transistors, positive temperature coefficient thermistors (PTCs), other positive or negative temperature coefficient elements, current-limiters and diodes.

In some embodiments, the element is a temperature-sensitive element and it measures the sensed temperature. In these cases the sensed temperature is obtained in a local area, meaning locally to the TBU. In other embodiments, the temperature control unit has a remote temperature sensor for measuring the sensed temperature in a remote area, meaning away from the TBU itself. The choice depends on the intended application of the apparatus. Preferably, however, the apparatus is integrated. In other words, the TBU and the temperature control unit are integrated on one die or in the same package.

In another embodiment, the apparatus has a TBU that uses at least two n-channel devices, e.g., MOSFETs, and a PTC that is interconnected with them. The interconnection is performed such that a transient alters a resistance of the PTC and a bias voltage $V_n$ of the n-channel devices. The effect is that the n-channel devices and the PCT mutually switch off to block the transient. The apparatus in this embodiment can have a temperature control unit in communication with the TBU. For example, the temperature control unit can be connected to the PTC for performing adjustments of its temperature response or with the TBU for adjusting the bias voltage $V_n$. It should be noted, that in order to derive full advantage of this embodiment the PTC be placed in thermal contact with the n-channel devices.

The invention further extends to a method for temperature-dependent transient blocking by providing a TBU with interconnected n-channel and p-channel devices, measuring the sensed temperature and adjusting at least one of the bias voltages $V_p$, $V_n$ in response to the sensed temperature. The sensed temperature can be measured in a local area, e.g., in the TBU, or in a remote area, e.g., near the TBU where a critical temperature or over-temperature is to be monitored. The sensed temperature can be measured by a temperature-sensitive element that may or may not be integrated with the apparatus.

In an alternative method for temperature-dependent transient blocking, the TBU is provided with at least two n-channel devices and a PTC. The n-channel devices and the PTC are interconnected such that they mutually switch off to block the transient. The bias voltage $V_n$ can be further adjusted in response to a sensed temperature, i.e., not only in response to the temperature sensed by the PTC. Again, to derive full advantage in this method, the PTC needs to be placed in good thermal contact with the n-channel devices. This can be accomplished by sandwiching the PTC between them.

A detailed description of the preferred embodiments of the invention is presented below in reference to the appended drawing figures.

DETAILED DESCRIPTION

Figure 1:
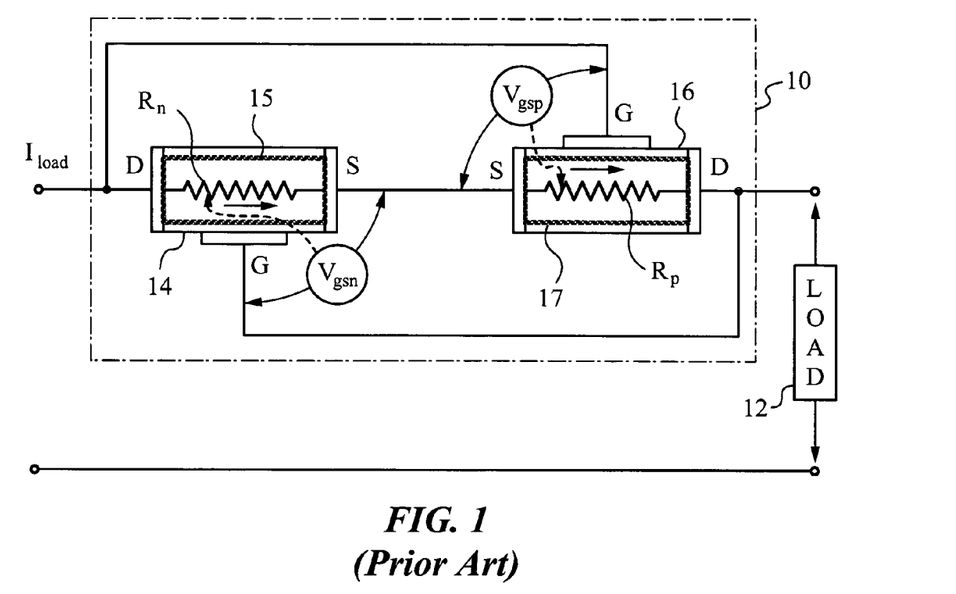
FIG. 1 is a diagram illustrating the basic principle of operation of a prior art uni-directional transient blocking unit (TBU).

The present invention and its principles will be best understood by first reviewing prior art uni-directional and bi-directional transient blocking units (TBUs) designed for over-voltage and over-current protection. The diagram in FIG. 1 shows a prior art TBU 10 for protecting a load 12 from voltage and/or current transients of one polarity, i.e., positive voltage spikes or surges. For this reason, TBU 10 is called uni-directional. TBU 10 uses a depletion mode n-channel device 14 and a depletion mode p-channel device 16, both of which can be implemented by field effect transistors (FETs). Devices 14, 16 are interconnected to take advantage of their n-channel and p-channel biasing and resistance properties to cause mutual switch off to block the transient.

More specifically, devices 14, 16 have corresponding n- and p-channels 15, 17 as well as gate G, source S and drain D terminals. Resistances $R_n$, $R_p$ of devices 14, 16 are low when voltage differences or bias voltages $V_{gsn}$ and $V_{gsp}$ between their gate G and source S terminals are zero. Normally, TBU 10 is unblocked and devices 14, 16 act as small resistors that allow a load current $I_{load}$ to pass to load 12. Application of negative bias $V_{gsn}$ to n-channel device 14 and positive bias $V_{gsp}$ to p-channel device 16 increases resistances $R_n$, $R_p$, as indicated by the arrows and turns devices 14, 16 off. The interconnection of devices 14, 16 source-to-source and gate-to-drain reinforces the biasing off process in response to a transient. Specifically, as load current $I_{load}$ increases device 16 develops a larger voltage drop across it, thus increasing negative bias $V_{gsn}$ applied to device 14 and consequently increasing resistance $R_n$. Higher resistance $R_n$ increases positive bias $V_{gsp}$ on device 16 thereby increasing $R_p$. Thus, the transient alters bias voltages $V_{gsn}$ and $V_{gsp}$ in concert such that devices 14, 16 mutually increase their resistances $R_n$, $R_p$ and switch off and thus TBU 10 blocks the transient.

Figure 2:
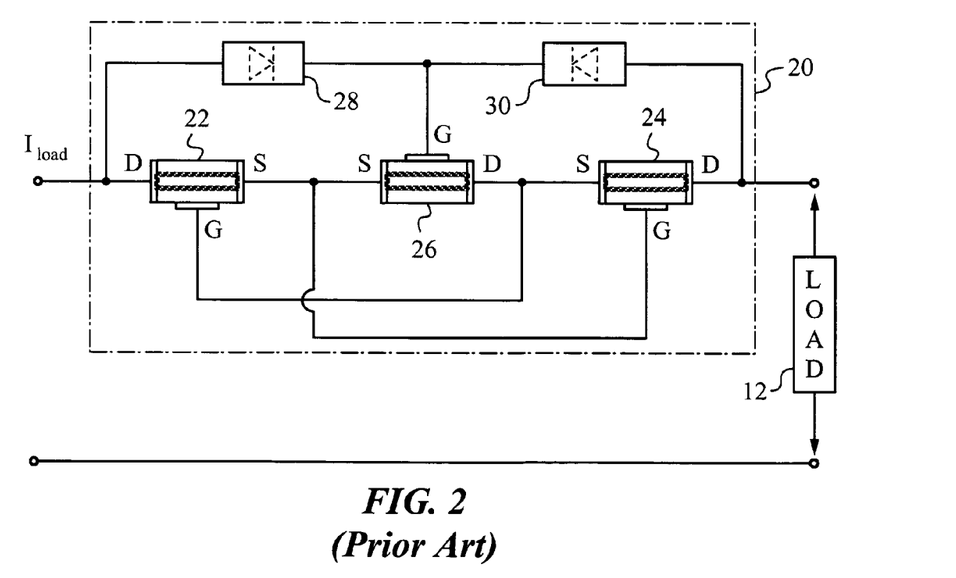
FIG. 2 is a diagram illustrating the basic principle of operation of a prior art bi-directional TBU.

The above principle of interconnection of n- and p-channel devices to achieve mutual switch off (sometimes also referred to as mutual pinch-off) is extended to bi-directional TBUs by using two uni-directional TBUs with one configured in reverse to block negative spikes. A simpler, bi-directional TBU 20 that protects load 12 from negative and positive spikes, is shown in FIG. 2. TBU 20 has two n-channel devices 22, 24 and one p-channel device 26. Devices 22, 24, 26 are interconnected between their gate G, source S and drain D terminals as shown. Two current limiters 28, 30 are used to ensure appropriate routing of current between devices 22, 24, 26. Current limiters 28, 30 can be diodes, resistors, transistors, current sources or combinations thereof. TBU 20 causes mutual switch off of devices 22, 24, 26 in response to a negative or positive spike by employing the principles of controlling resistances by biasing in response to transients as explained above.

In fact, the prior art teaches a number of variants of TBUs based on the above principles. These include, among other, TBUs that use p-channel devices at inputs, a larger number of n-channel or p-channel devices as well as TBUs that employ high-voltage depletion devices. More detailed information about prior art TBUs and associated applications and methods can be found in published literature including, in particular, PCT/AU94/00358, PCT/AU04/00117; PCT/AU03/00175; PCT/AU03/00848 and U.S. Pat. No. 5,742, 463 that are herein incorporated by reference.

Figure 3:
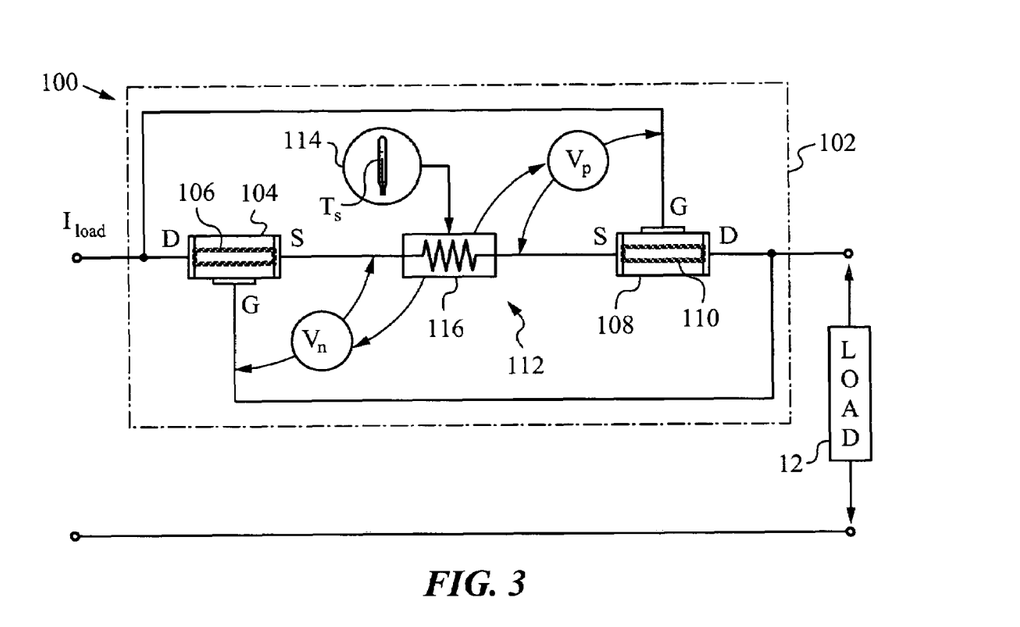
FIG. 3 is a diagram of an apparatus in accordance with the invention implemented with a uni-directional TBU.

An apparatus 100 for temperature-dependent transient blocking in accordance with the invention is shown in FIG. 3. Apparatus 100 employs a uni-directional TBU 102 that has a depletion mode device 104 with an n-channel 106 interconnected with a depletion mode device 108 with a p-channel 110. The interconnection is performed source-to-source (S-S) and gate-to-drain (G-D) such that a transient alters a bias voltage $V_p$ of p-channel device 108 and a bias voltage $V_n$ of n-channel device 104 in concert. Specifically, bias voltages $V_p$, $V_n$ are altered such that p- and n-channel devices 108, 104 mutually switch off to block the transient.

Apparatus 100 has a temperature control unit 112. In the present embodiment, unit 112 has a temperature sensor 114 and an element 116 connected with TBU 102 in the S-S interconnection of devices 104, 108. Temperature sensor 114 is located within TBU 102 for measuring a sensed temperature $T_s$ in a local area, i.e., within TBU 102, and communicating $T_s$ to element 116. Element 116 is a variable circuit element, here a resistor, that can change its resistance value in response to a signal corresponding to $T_s$ from sensor 114.

During operation, uni-directional TBU 102 of apparatus 100 is initially driven to block positive surges by altering bias voltages $V_n$ and $V_p$ in concert such that devices 104, 108 mutually increase resistances $R_n$, $R_p$ of n- and p-channels 106, 110 and thus mutually switch off to block any transient. Temperature control unit 112 further adjusts bias voltages $V_n$ and $V_p$ in response to sensed temperature $T_s$ communicated by sensor 114. In particular, the signal from sensor 114 and corresponding to $T_s$ changes the resistance of variable resistor 116. As a result, bias voltages $V_n$ and $V_p$ are adjusted in response to sensed temperature $T_s$, as indicated by the arrows.

Variable resistor 116 and sensor 114 that is in series with p-channel device 108 are calibrated such that when sensed temperature $T_s$ is within an acceptable range the resistance of resistor 116 is negligibly small. Thus, there is no or only a negligible effect on bias voltages $V_n$ and $V_p$. TBU 102 will only switch off in this condition when either a positive over-voltage or over-current causes mutual switch off of devices 104, 108. When sensed temperature $T_s$ falls outside the acceptable range, resistor 116 assumes a significant resistance value. The value is sufficiently large to cause the accelerate or even provoke mutual shut-off of n- and p-channel devices 104, 108 even when over-voltage or over-current are not by themselves significant enough to cause switch-off. Of course, TBU 102 will switch off in the case of a critical combination of any of these three factors.

Variable resistor 116 and sensor 114 of temperature control unit 112 can be integrated on the same die with TBU 102 or in the same package (not shown). Because of the high-performance of TBU 102, apparatus 100 provides temperature-dependent transient protection while satisfying the stringent requirements dictated by sensitive circuits, e.g., telecommunication circuits. In addition, apparatus 100 is simple in construction, requires few parts and is highly integrable.

Figure 4:
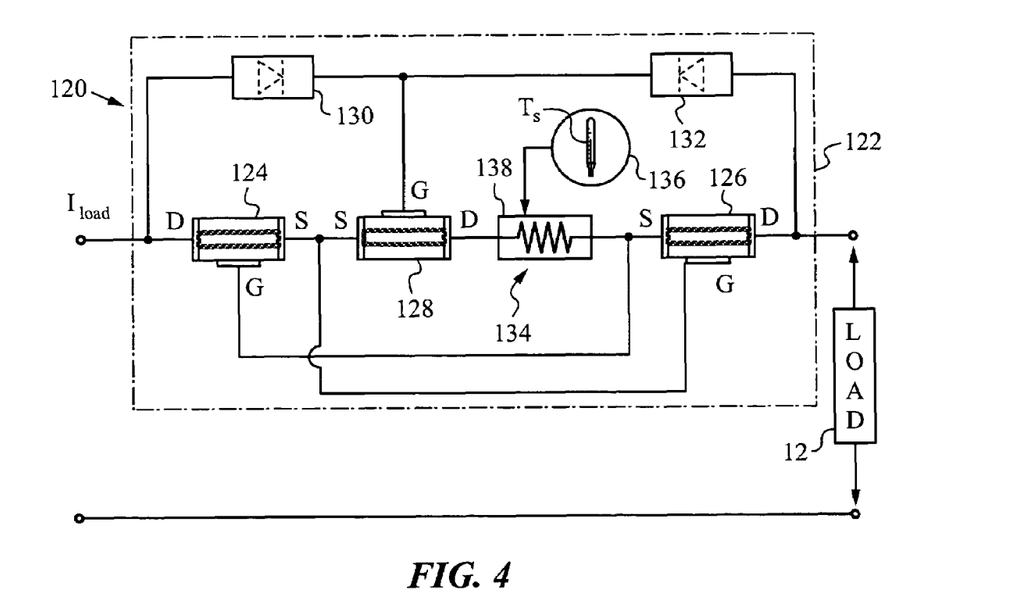
FIG. 4 is a diagram of an apparatus of the invention implemented with a bi-directional TBU.

FIG. 4 is a diagram of an apparatus 120 of the invention implemented with a bi-directional TBU 122. Bi-directional TBU 122 has two n-channel devices 124, 126 and one p-channel device 128 interconnected in the manner described above with reference to FIG. 2. Two current limiters 130, 132 are used to ensure appropriate routing of current between devices 124, 126, 128. Current limiters 130, 132 can be diodes, resistors, transistors, current sources or combinations thereof.

Apparatus 120 has a temperature control unit 134 consisting of a temperature sensor 136 and an element 138 connected with TBU 102 in the interconnection of devices 126, 128. Temperature sensor 136 is internal, i.e., it is located within TBU 122, for measuring a sensed temperature $T_s$ in a local area and communicating $T_s$ to element 138. Element 138 is a variable resistor that can change its resistance value in response to a signal from sensor 136 indicative of $T_s$.

During operation, TBU 122 is initially driven to block positive surges by altering bias voltages $V_n$ and $V_p$ in concert such that devices 124, 126 and 128 mutually switch off to block a transient of either polarity, i.e., either a positive or negative over-voltage or over-current. Temperature control unit 134 further adjusts bias voltages $V_n$ and $V_p$ in response to sensed temperature $T_s$ communicated by sensor 136. In particular, the signal from sensor 136 indicative of $T_s$ changes the resistance of variable resistor 138. As a result, bias voltages $V_n$ and $V_p$ are adjusted in response to sensed temperature $T_s$.

Variable resistor 138 and sensor 136 are calibrated such that when sensed temperature $T_s$ is within an acceptable range the resistance of resistor 138 is negligibly small. Thus, there is no or only a negligible effect on bias voltages $V_n$ and $V_p$. TBU 122 will only switch off in this condition when either a positive or negative spike causes mutual switch off of devices 124, 126 and 128. When sensed temperature $T_s$ falls outside the acceptable range, resistor 138 assumes a significant resistance value. The value is sufficiently large to cause the mutual shut-off of n- and p-channel devices 124, 126 and 128 even when there is no over-voltage or over-current. Of course, TBU 122 will also switch off in the case of a combination of any of these three factors.

As in the previous embodiment, variable resistor 138 and sensor 136 of temperature control unit 134 can be integrated on the same die with TBU 102 or in the same package (not shown). Because of the high-performance of TBU 122, apparatus 120 provides temperature-dependent transient protection while satisfying the stringent requirements dictated by sensitive circuits. Furthermore, apparatus 120 is simple in construction, requires few parts and is highly integrable.

Figure 5:
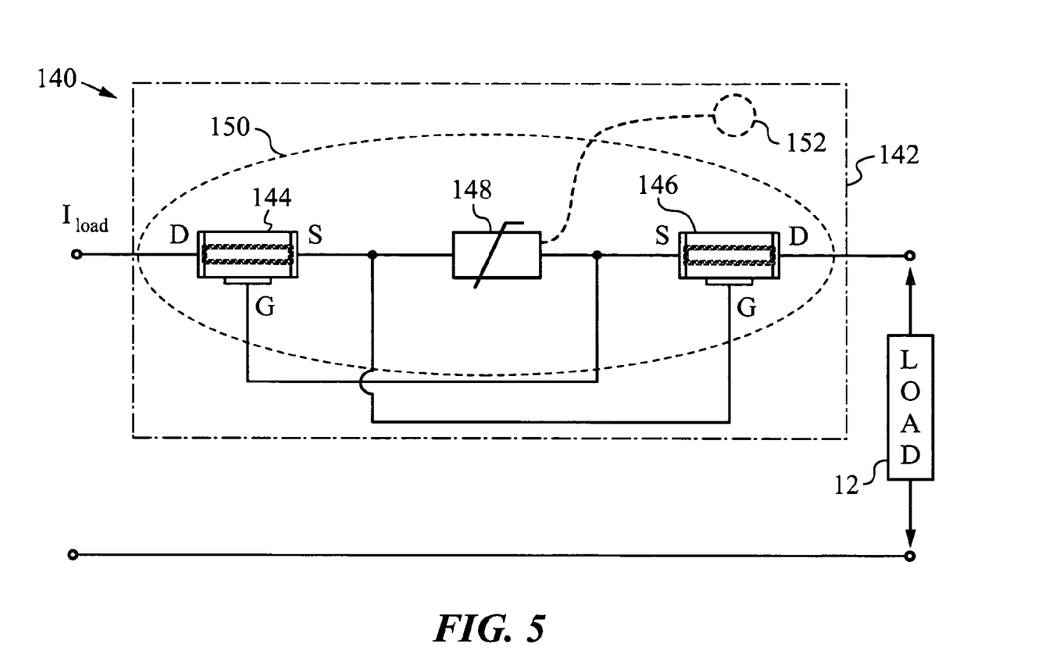
FIG. 5 is a diagram of an apparatus employing a TBU with a PTC in accordance with the invention.

In another embodiment, as shown in FIG. 5, an apparatus 140 has a TBU 142 that uses two n-channel devices 144, 146, in this case MOSFETs, and a PTC 148 that is interconnected with them. Specifically, PTC 148 is interconnected in the S-S interconnection of devices 144, 146. PTC 148 can be a low voltage and low nominal resistance device, e.g., 10 Ω and is preferably sandwiched between devices 144, 146 to provide for a good thermal contact. The thermal contact is indicated by the dashed outline 150.

PTC 148 replaces the p-channel device employed in the previous embodiments. TBU 142 is bi-directional and the interconnection is performed such that a transient alters a resistance of PTC 148 and a bias voltage $V_n$ of n-channel devices 144, 146. The effect is that n-channel devices 144, 146 and PTC 148 mutually switch off to block the transient. That is because any heat generated in high voltage n-channel devices 144, 146 heats up PTC 148 and causes it to trip. Once tripped, the resistance of PTC 148 will increase and cause MOSFETs 144, 146 to pinch-off or mutually switch off, therefore limiting through current while maintaining TBU 142 at a set temperature, e.g., 125 degrees. The amount of negative feedback generated ensures that MOSFETs 144, 146 let through enough current to keep PTC 148 hot and tripped. In practice, the dissipation from TBU 142 to stay tripped or switched off should be about 1.5 Watts.

Gentle tripping of PTC 148 makes apparatus 140 very reliable and less subject to resistance change. As MOSFETs 144, 146 drop all the voltage, the combination is able to block 600 V rms continuously. The current-limiting action of MOSFETs 144, 146 ensures that TBU 142 will not let through large currents for short periods of time. Its reactions are flat at 200 milliamps let-though current for fast or slow transients. TBU can be made very low resistance for high current operation at low voltage, e.g., 110 V ac. The response time of TBU 142 can be on the order of microseconds for current limiting and the switch off times on the order of 0.1 sec (as dictated by PTC 148). TBU 142 can handle a maximum impulse voltage in excess of 900 V.

In alternative embodiments, apparatus 140 can have a temperature control unit 152 in communication with TBU 142. For example, unit 152 can be connected to PTC 148 for performing adjustments of its temperature response or with TBU 142 for adjusting the bias voltage $V_n$ of any of MOSFETs 144, 146.

Figure 6:
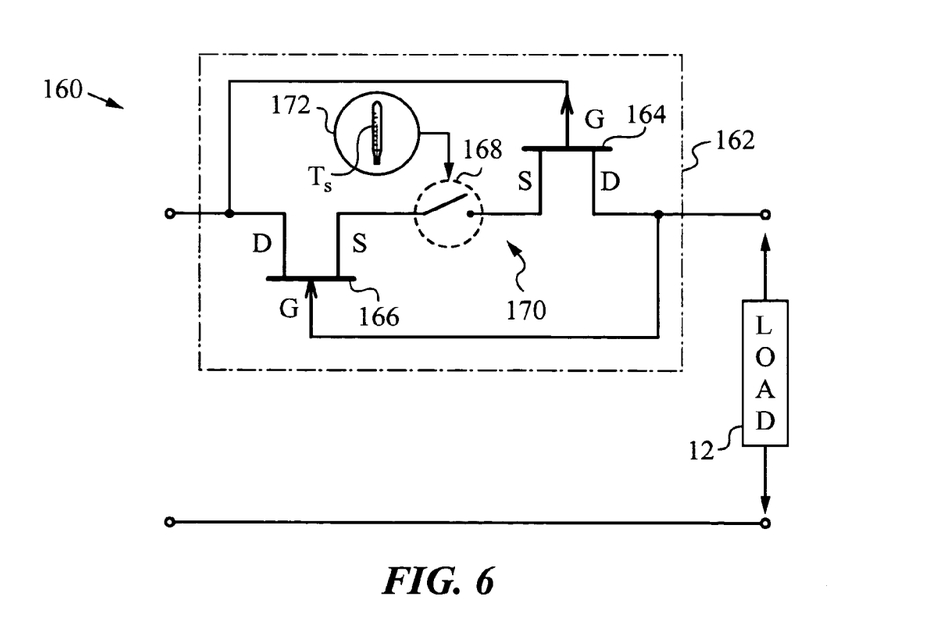
FIG. 6 is a diagram of a preferred embodiment of a uni-directional apparatus.

FIG. 6 is a diagram of a preferred embodiment of a uni-directional apparatus 160 that employs a TBU 162 with FETs 164, 166. In particular, TBU 162 has junction-gate field effect transistor (PJFET) 164 and metal-oxide-semiconductor field effect transistor (MOSFET) 166 interconnected source-to-source and drain-to-gate. An element 168 of a temperature control unit 170 is a transistor or a switch connected between the sources of PJFET 164 and MOSFET 166. A temperature sensor 172 is provided for measuring a sensed temperature $T_s$ locally.

The operation of apparatus 160 is analogous to embodiments using uni-directional TBUs as described above. Switch 168 responds to sensed temperature $T_s$ and adjusts bias voltage by switching from closed to open-circuit condition, thus making a discontinuous change in resistance. In alternative embodiments, switch 168 is replaced by other variable circuit element selected from among resistors, transistors, PTCs, other positive temperature coefficient elements, current-limiters and diodes. Note that is some embodiments a negative temperature coefficient element may be use to compensate TBU 162 for increasing temperature. In some of these embodiments, element 168 itself is a temperature-sensitive element. It thus represents unit 170 by itself and performs the function of temperature sensor 172 by measuring $T_s$ locally and responding to the value of $T_s$.

Figure 7:
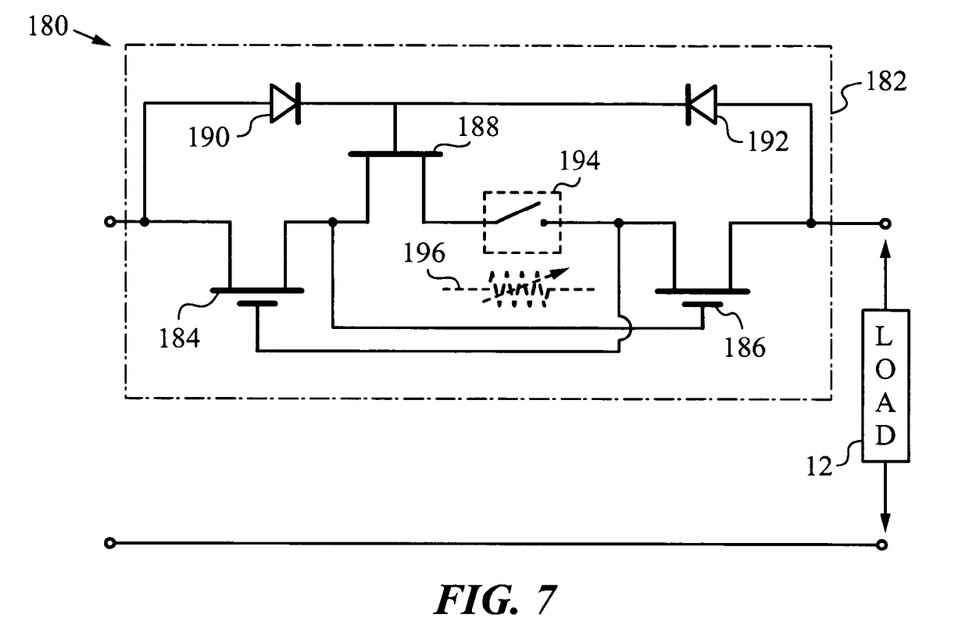
FIG. 7 is a diagram of a preferred embodiment of a bi-directional apparatus.

FIG. 7 shows the diagram of a preferred embodiment of an apparatus 180 with a bi-directional TBU 182 employing two NMOS transistors 184, 186, a PJFET 188 and two diodes 190, 192 as current limiters. In this case a temperature control unit 194 is indeed a single element, specifically a switch. Alternatively, a variable resistor 196 such as a diffused resistor, polysilicon resistor or thin film resistor can be used. In fact, any suitable temperature-sensitive switching element can be adapted to operate as control unit 194. Suitable elements include positive and negative temperature coefficient elements as well as other semiconductor devices including transistors, thermistors and diodes.

TBU 182 effectuates mutual switching off of NMOS transistors 184, 186 and PJFET 188 in response to positive and negative surges as well as over-temperature. The response to temperature is dictated by whether the element used as control unit 194 has a positive or negative temperature coefficient.

Figure 8:
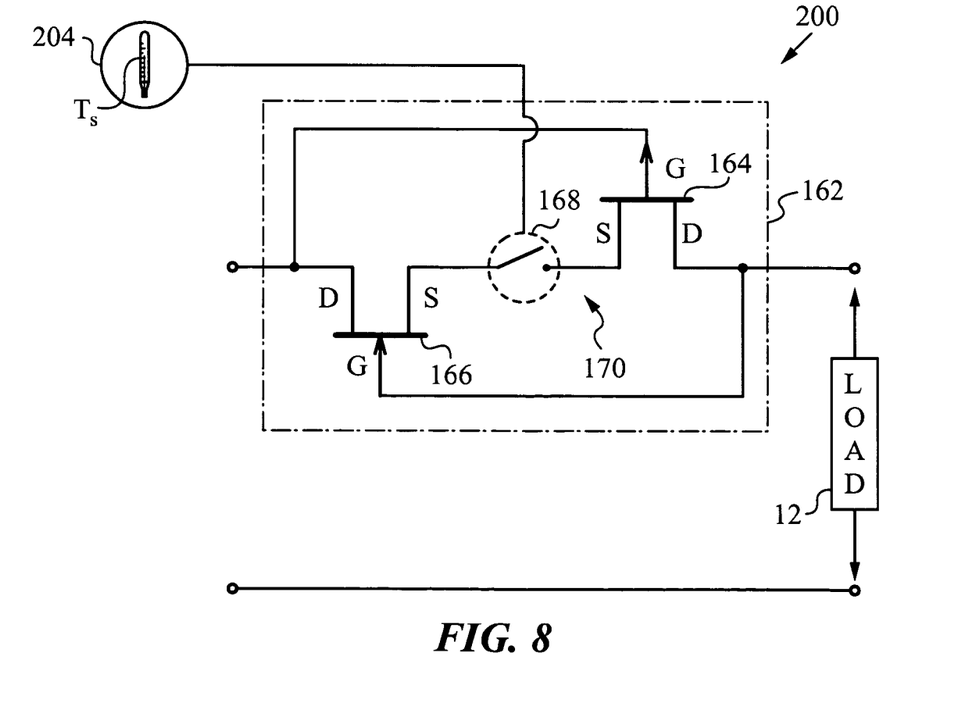
FIG. 8 is a diagram of another embodiment employing a uni-directional TBU and a remote temperature sensor.

FIG. 8 illustrates an apparatus 200 that employs uni-directional TBU 162 as shown in FIG. 6. The same reference numerals are used to designate corresponding parts. In this embodiment, the temperature control unit 170 has a remote temperature sensor 204 for measuring sensed temperature $T_s$ in a remote area, meaning away from the TBU itself. The operation of apparatus 200 is otherwise analogous to apparatus 160 and admits of same alternatives.

Figure 9:
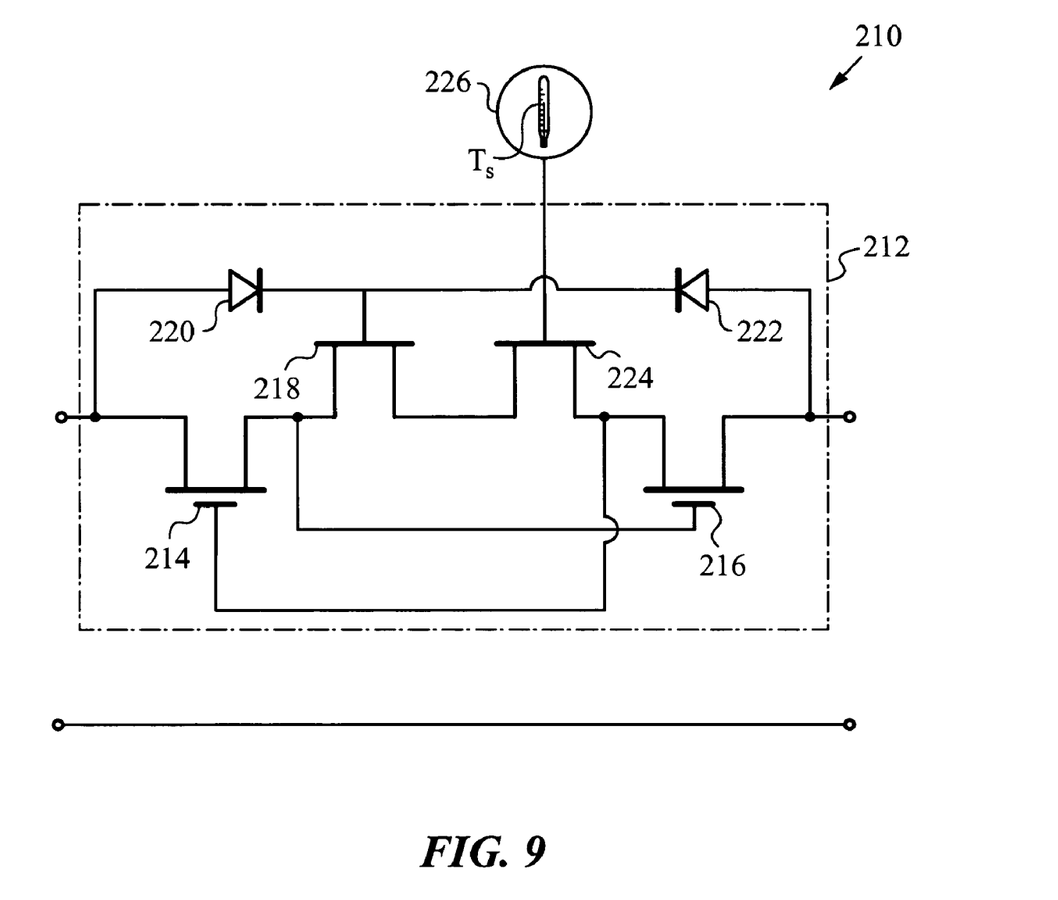
FIG. 9 is a diagram of still another embodiment employing a bi-directional TBU and a remote temperature sensor.

Still another apparatus 210 in accordance with the invention is illustrated in the diagram of FIG. 9. Apparatus 210 employs a bi-directional TBU 212. TBU 212 has two NMOS transistors 214, 216, a PJFET 218 and two diodes 220, 222 serving as current limiters. A depletion mode device 224 is inserted in series with PJFET 218 to switch off TBU 212 in response to a sensed temperature $T_s$ measured by a remote temperature sensor 226.

It should be noted that the choice of local or remote temperature sensing depends on the intended application of the apparatus. The temperature can be sensed locally in the S-S connection, at the n- and p-channel devices, within the TBU or outside the TBU. When measuring the temperature locally, variable resistors can be replaced with thermistors, diode connected transistors and various types of other suitable transistors and semiconductor devices. Preferably, however, the apparatus is integrated. In other words, the TBU and the temperature control unit are integrated on one die or in the same package.

In yet other applications of the invention, it may be desirable to reverse the temperature sensitivity of the TBU and thus compensate for increasing resistance of the TBU. Such reversal can be accomplished with variable circuit that has a negative temperature coefficient rather than a positive one. This approach can be implemented in any of the previous temperature control units.

The invention and its various embodiments provide for an alternative protection device that is capable of simultaneous over-voltage, over-current and over-temperature protection while satisfying stringent requirements laid down by sensitive circuits. Furthermore, the temperature-dependent transient blocking device is simple in construction, requires few parts and is highly integrable either on the same die as the remainder of the device or at least the TBU or in the same package with the TBU.

Many other embodiments of the apparatus and method are possible. Therefore, the scope of the invention should be judged by the appended claims and their legal equivalents.

We claim:

1. An apparatus for temperature-dependent transient blocking, said apparatus comprising:
   a) a transient blocking unit having at least one depletion mode n-channel device interconnected with at least one depletion mode p-channel device such that a transient alters a bias voltage $V_p$ of said depletion mode p-channel device and a bias voltage $V_n$ of said depletion mode n-channel device, whereby said depletion mode p-channel device and said depletion mode n-channel device mutually switch off to block said transient;
   b) a temperature control unit in communication with said transient blocking unit for adjusting at least one of said bias voltages $V_p$, $V_n$ in response to a sensed temperature.

2. The apparatus of claim 1, wherein said temperature control unit comprises an element connected in said transient blocking unit for adjusting at least one of said bias voltages $V_p$, $V_n$.

3. The apparatus of claim 2, wherein said element comprises a switch for adjusting at least one of said bias voltages $V_p$, $V_n$ by an open-circuit condition of said switch.

4. The apparatus of claim 2, wherein said element comprises a variable circuit element.

5. The apparatus of claim 4, wherein said variable circuit element is a transistor connected between said at least one depletion mode p-channel device and said at least one depletion mode n-channel device.

6. The apparatus of claim 5, wherein said at least one depletion mode p-channel device comprises a PJFET and said at least one depletion mode n-channel device comprises a MOSFET and said transistor is connected between sources of said PJFET and said MOSFET.

7. The apparatus of claim 4, wherein said variable circuit element is selected from the group consisting of resistors, transistors, positive temperature coefficient thermistors, positive temperature coefficient elements, negative temperature coefficient elements, current-limiters and diodes.

8. The apparatus of claim 2, wherein said element comprises a temperature-sensitive element for measuring said sensed temperature in a local area.

9. The apparatus of claim 1, wherein said temperature control unit-comprises a remote temperature sensor for measuring said sensed temperature in a remote area.

10. The apparatus of claim 1, wherein said transient blocking unit and said temperature control unit are integrated.

11. An apparatus for temperature-dependent transient blocking, said apparatus comprising a transient blocking unit having at least two depletion mode n-channel devices and a positive temperature coefficient thermistor interconnected with said at least two depletion mode n-channel devices such that a transient alters a resistance of said positive temperature coefficient thermistor and a bias voltage $V_n$ of said depletion mode n-channel devices, whereby said depletion mode n-channel devices and said positive temperature coefficient thermistor mutually switch off to block said transient.

12. The apparatus of claim 11, further comprising a temperature control unit in communication with said positive temperature coefficient thermistor for performing adjustments.

13. The apparatus of claim 11, further comprising a temperature control unit in communication with said transient blocking unit for adjusting said bias voltage $V_n$.

14. The apparatus of claim 11, wherein said at least two depletion mode n-channel devices and said positive temperature coefficient thermistor are in thermal contact.

15. The apparatus of claim 11, wherein said at least two depletion mode n-channel devices comprise at least one MOSFET.

16. A method for temperature-dependent transient blocking comprising:
 a) providing a transient blocking unit having at least one depletion mode n-channel device interconnected with at least one depletion mode p-channel device such that a transient alters a bias voltage $V_p$ of said depletion mode p-channel device and a bias voltage $V_n$ of said depletion mode n-channel device, whereby said depletion mode p-channel device and said depletion mode n-channel device mutually switch off to block said transient;
 b) measuring a sensed temperature; and
 c) adjusting at least one of said bias voltages $V_p$, $V_n$ in response to said sensed temperature.

17. The method of claim 16, wherein said sensed temperature is measured in a local area.

18. The method of claim 16, wherein said sensed temperature is measured in a remote area.

19. The method of claim 16, wherein said sensed temperature is measured by a temperature-sensitive element.

20. The method of claim 19, wherein said transient blocking unit and said temperature-sensitive element are integrated.

21. A method for temperature-dependent transient blocking comprising:
 a) providing a transient blocking unit having at least two depletion mode n-channel devices and a positive temperature coefficient thermistor;
 b) interconnecting said at least two depletion mode n-channel devices such that a transient alters a resistance of said positive temperature coefficient thermistor and a bias voltage $V_n$ of said depletion mode n-channel devices, whereby said depletion mode n-channel devices and said positive temperature coefficient thermistor mutually switch off to block said transient.

22. The method of claim 21, further adjusting said bias voltage $V_n$ in response to a sensed temperature.

23. The method of claim 21, further comprising placing said positive temperature coefficient thermistor in thermal contact with said at least two depletion mode n-channel devices.

24. The method of claim 23, wherein said placing in thermal contact comprises sandwiching.

* * * * *